United States Patent
Heren et al.

(10) Patent No.: US 9,604,537 B2
(45) Date of Patent: Mar. 28, 2017

(54) VEHICLE WITH HYDRAULIC ASSISTANCE BY TRANSMITTING TORQUE FROM A DRIVING AXLE TO A DRIVEN AXLE

(71) Applicant: Poclain Hydraulics Industrie, Verberie (FR)

(72) Inventors: Jean Heren, Verberie (FR); Cyrille d'Hersignerie, Verberie (FR); Laurent Albert, Verberie (FR); Julien Lambey, Verberie (FR); Clement Recoura, Verberie (FR); Christophe Gouzou, Verberie (FR)

(73) Assignee: POCLAIN HYDRAULICS INDUSTRIE, Verberie (FR)

( * ) Notice: Subject to any disclaimer, the term of this patent is extended or adjusted under 35 U.S.C. 154(b) by 0 days.

(21) Appl. No.: 14/431,293

(22) PCT Filed: Sep. 19, 2013

(86) PCT No.: PCT/EP2013/069519
§ 371 (c)(1),
(2) Date: Mar. 25, 2015

(87) PCT Pub. No.: WO2014/048841
PCT Pub. Date: Apr. 3, 2014

(65) Prior Publication Data
US 2015/0251533 A1    Sep. 10, 2015

(30) Foreign Application Priority Data

Sep. 28, 2012 (FR) ...................................... 12 59191

(51) Int. Cl.
*B60K 17/356*    (2006.01)
*B60K 17/10*    (2006.01)
(Continued)

(52) U.S. Cl.
CPC .......... *B60K 17/356* (2013.01); *B60K 17/105* (2013.01); *B60K 17/36* (2013.01);
(Continued)

(58) Field of Classification Search
CPC .... B60K 17/36; B60K 17/105; B60K 17/356; B60K 23/08; B60K 23/0808; B60K 2023/0858; B62D 61/12
(Continued)

(56) References Cited

U.S. PATENT DOCUMENTS 5,540,299 A * 7/1996 Tohda ...................... B60K 6/12
180/242

FOREIGN PATENT DOCUMENTS

DE    195 10 046 A1    10/1995
DE    198 23 508 A1    1/1999
(Continued)

*Primary Examiner* — Kevin Hurley
*Assistant Examiner* — Felicia L Brittman
(74) *Attorney, Agent, or Firm* — Blakely Sokoloff Taylor & Zafman LLP

(57) ABSTRACT

A vehicle including a driving axle (10), a driven axle (20), a hydraulic pump (14) and a hydraulic motor (24) providing hydraulic assistance for driving the driven axle (20) by lapping off torque applied to the driving axle (10). The driving axle (10) comprising includes a differential (11) thus defining two output half axles on which wheels are mounted. Rotation of the box allows the output half axles to be rotationally driven at distinct speeds. The hydraulic pump (14) includes a rotor and a stator, the stator being mounted fixed with respect to the chassis and the rotor being connected to and rotating as one with the differential box (11). The hydraulic pumps (14) are rotationally driven at a speed equal to the average speed of the two half axles associated with the differential (11) on which the pump is mounted.

8 Claims, 6 Drawing Sheets

Figure 1:
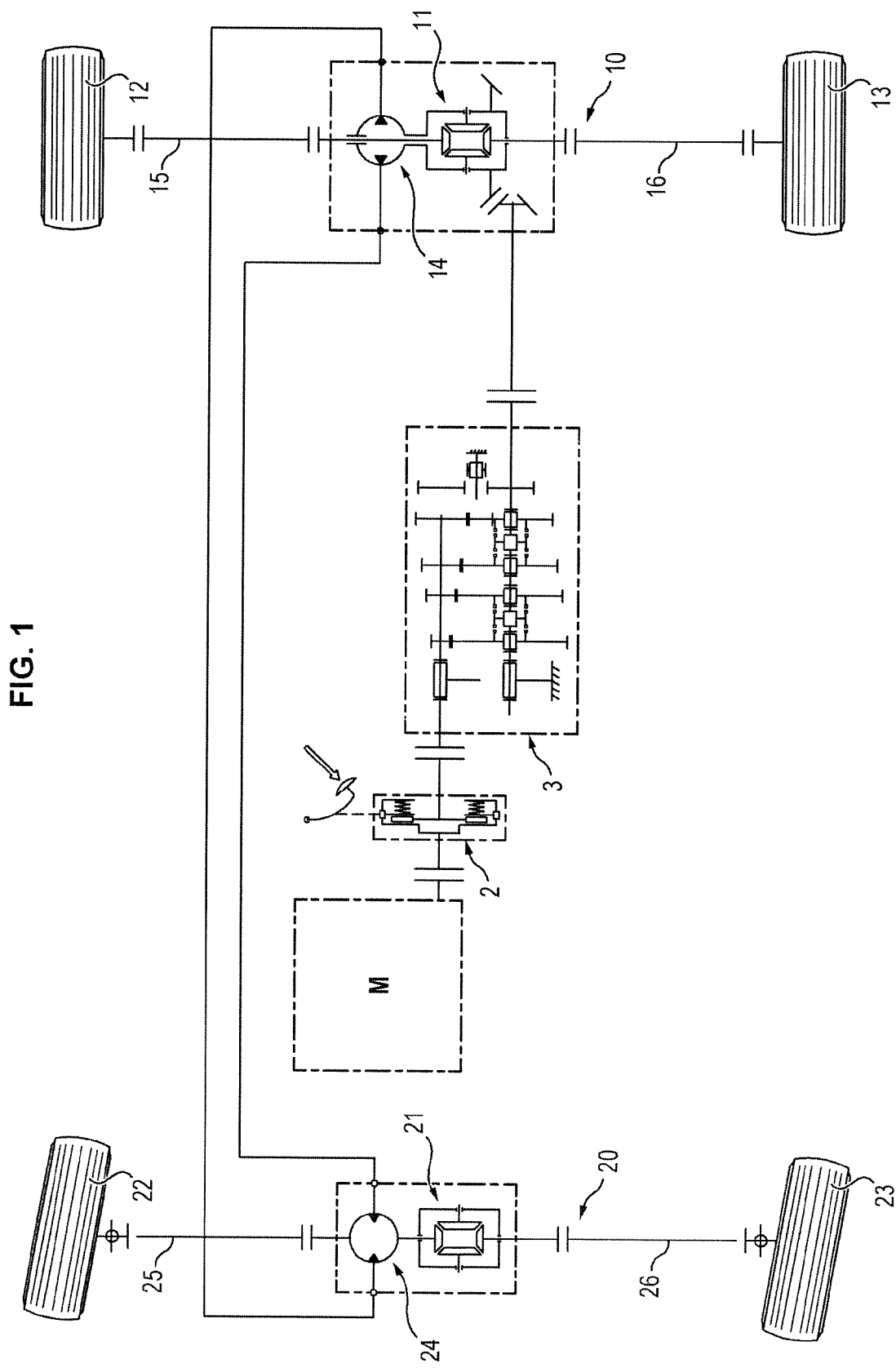

(51) Int. Cl.
  *B60K 17/36* (2006.01)
  *B60K 23/08* (2006.01)
  *B62D 61/12* (2006.01)

(52) U.S. Cl.
  CPC .......... *B60K 23/08* (2013.01); *B60K 23/0808* (2013.01); *B62D 61/12* (2013.01); *B60K 2023/0858* (2013.01)

(58) Field of Classification Search
  USPC ........................................................ 180/242
  See application file for complete search history.

(56) References Cited

FOREIGN PATENT DOCUMENTS

| | | |
|---|---|---|
| DE | 10 2011 118111 A1 | 5/2012 |
| EP | 2 193 951 A1 | 6/2010 |
| FR | 2 621 280 A1 | 4/1989 |
| GB | 2 229 977 A | 10/1990 |
| GB | 2229977 A * | 10/1990 ........... B60K 17/356 |
| JP | S60 139533 A | 7/1985 |

* cited by examiner

VEHICLE WITH HYDRAULIC ASSISTANCE BY TRANSMITTING TORQUE FROM A DRIVING AXLE TO A DRIVEN AXLE

GENERAL TECHNICAL FIELD

The present invention relates to the field of vehicles comprising hydraulic assistance, typically vehicles which can shift from two-wheel drive configuration to an all-wheel drive transmission.

PRIOR ART

There are vehicles known fitted with hydraulic assistance which can be selectively engaged according to preferred driving conditions to initiate driving of all or some of the wheels.

Such vehicles conventionally comprise a primary motor, for example a thermal motor, to which a first hydraulic device can be connected, having a pump function for feeding hydraulic motors which are typically mounted on wheels to drive them. The first hydraulic motor operating as a pump is typically coupled to a power take-off of the primary motor or the gearbox of the vehicle by means of a clutch for putting the hydraulic assistance of the vehicle into service or not.

Such mountings pose several problems; they require multiple hydraulic devices and clutches, and impose substantial reduction ratios.

PRESENTATION OF THE INVENTION

The aim of the present invention is to propose a vehicle fitted with hydraulic assistance not having this problem.

For this purpose, the invention proposes a vehicle comprising a chassis, a driving axle and a driven axle each connected to wheels, and a primary motor driving in rotation said driving axle, said vehicle further comprising a hydraulic pump and a hydraulic motor configured so as to selectively execute hydraulic assistance for driving the wheels of the driven axle,
said motor and hydraulic pumps being respectively mounted on the driven axle and on the driving axle, are each connected in rotation on the one hand to the chassis, and on the other hand to said driven axle and driving respectively, and are configured so that their operation executes driving wheels of the driven axle by sampling of the torque applied to the driving axle,
characterized in that the driving axle comprising a differential defining two semi-axles, said differential comprising a differential housing fitted with housing pinions adapted to cooperate with pinions each connected to an output semi-axle on which the wheels are mounted, the rotation of the housing enabling driving said output semi-axles in rotation at different speeds, the pump comprises a rotor and a stator, the stator being mounted fixed relative to the chassis and the rotor being connected in rotation to the housing of the differential,
the hydraulic pump being driven in rotation at a speed equal to the average speed of the two semi-axles attached to the differential on which it is mounted.

As a variant, the driven axle comprises a differential defining two semi-axles, said differential comprising a differential housing fitted with housing pinions adapted to cooperate with pinions each connected to an output semi-axle on which the wheels are mounted, the rotation of the housing driving said output semi-axles in rotation at different speeds, the hydraulic motor comprising a rotor and a stator, the stator being mounted fixed relative to the chassis and the rotor being connected in rotation to the housing of the differential, each of said motors and hydraulic pumps is connected directly to said differential housing without the intermediary of a clutch.

The pump and the hydraulic motor are typically hydraulic devices having radial retractable pistons and a multilobe cam, which can alternate between a service configuration and a free wheel configuration in which they have zero displacement.

According to a particular embodiment, the pump and the hydraulic motor are hydraulic devices with radial pistons each comprising a casing, a shaft, a multilobe cam and a cylinder block, said hydraulic devices each comprising two assemblies mobile in rotation one relative to the other:
 a first assembly defined by the casing, and
 a second assembly defined by the shaft, said first and second assemblies being free in rotation one relative to the other,
the cylinder block being mounted free in rotation relative to said first and second assemblies, the cam being connected in rotation to one or the other of these assemblies, each of said hydraulic devices further comprising an actuator for selectively producing immobilisation of the cylinder block relative to the other of said first or second assemblies, such that the cylinder block and the cam are each connected in rotation to a separate assembly, which causes operation of the hydraulic device.

According to a particular embodiment, said driving and driven axles form a hydraulically autonomous assembly without hydraulic connection with other sections of said vehicle with the exception of a boost pump.

According to a particular embodiment, said vehicle further comprises a driven directive axle in which the driven axle comprising the hydraulic motor is an adjustable axle comprising an actuator adapted to vary its height relative to the ground.

According to a particular embodiment, said vehicle comprises a driving axle and N−1 driven axles with N a natural whole number greater than or equal to 2, each of said axles being fitted with a hydraulic device connected together so that the hydraulic devices of the driven axles are mounted in parallel relative to the hydraulic device of the driving axle, said N hydraulic devices being configured such that
 displacement of the hydraulic device mounted on the driving axle is equal to $1+(N\times E)$ and
 displacement of each of the hydraulic devices of the driven axles is equal to $1/(N-1)$,
where E represents the value of estimated losses and leaks for a hydraulic device mounted on a driven axle.

The vehicle can also comprise a computer adapted, as a function of the conditions of travel of the vehicle, to define a threshold value such that when the travel speed of the vehicle is less than or equal to said threshold value, the motor(s) and the hydraulic pump(s) are put into service so as to provide hydraulic assistance on one or more axles of the vehicle, and the hydraulic assistance is disengaged when the travel speed of the vehicle is greater than said threshold value.

PRESENTATION OF FIGURES

Figure 2:
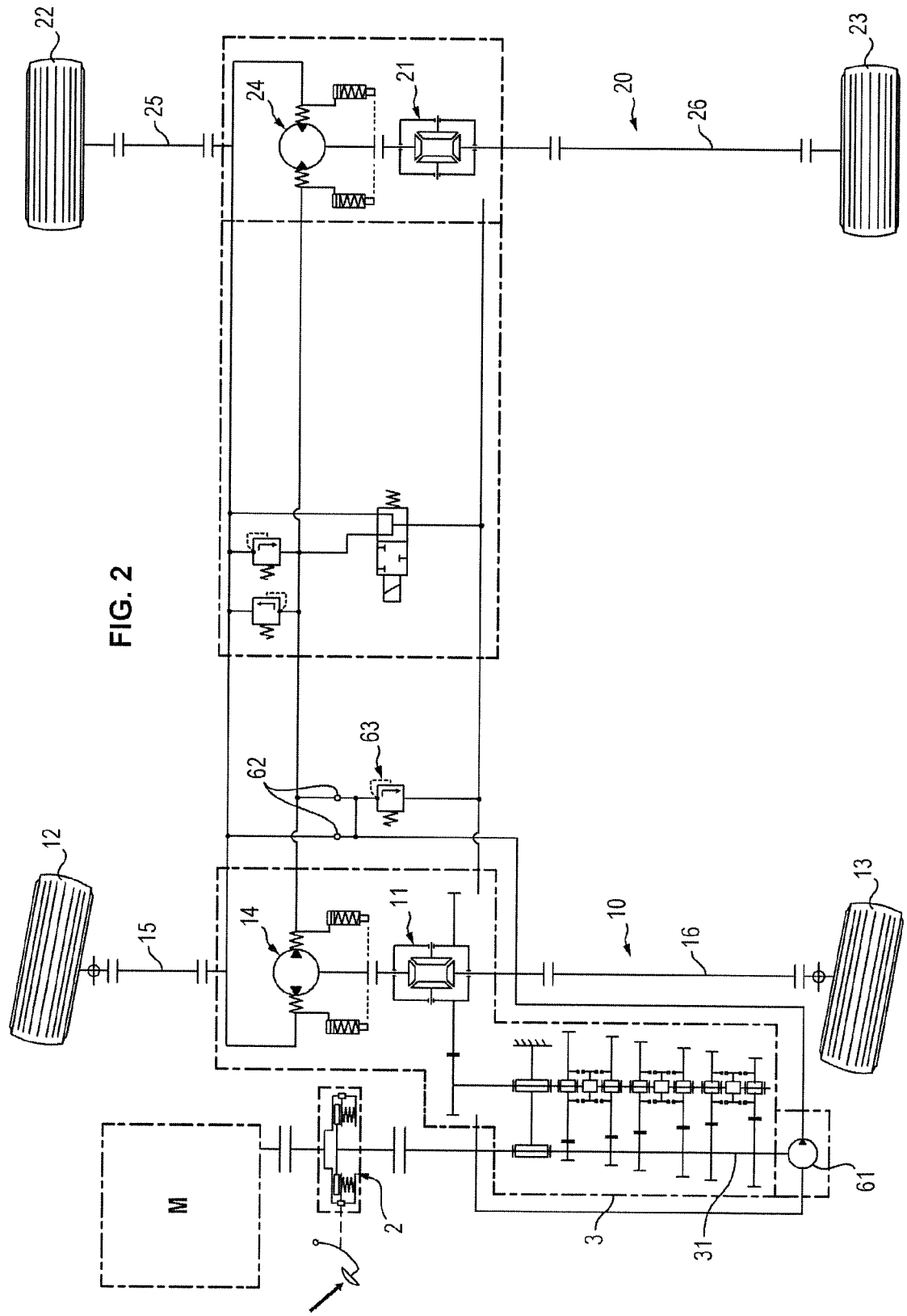
Figure 3:
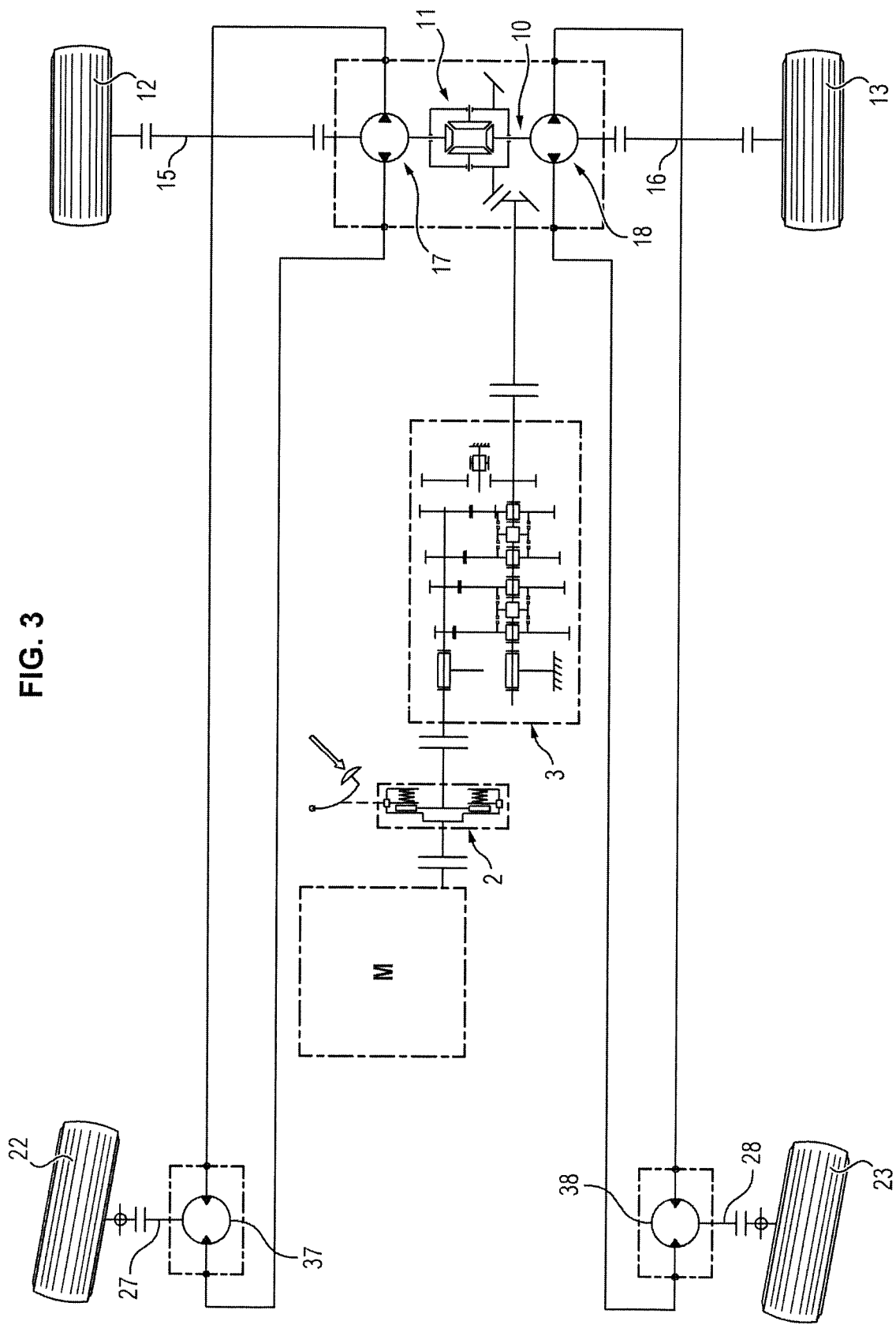
Figure 4:
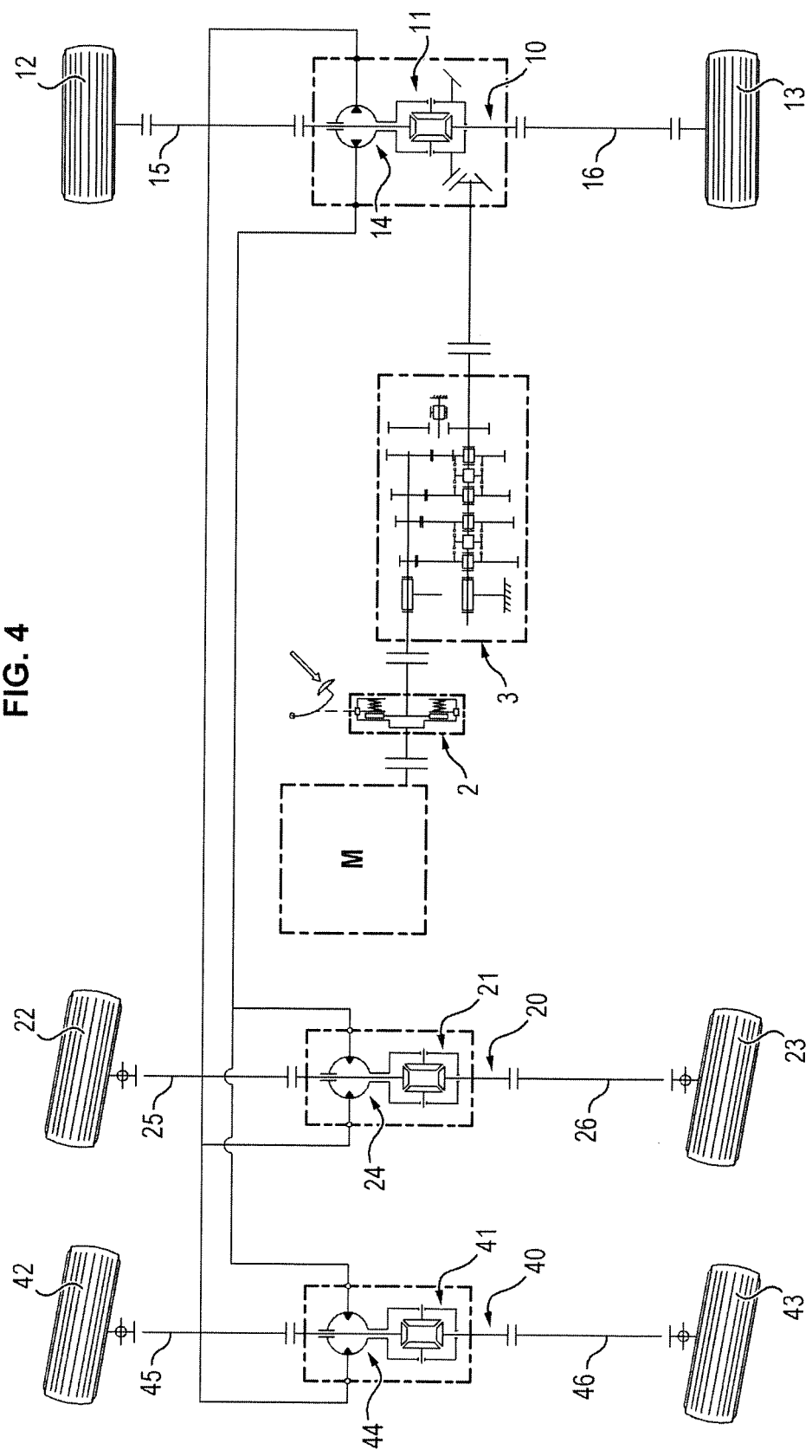
Figure 5:
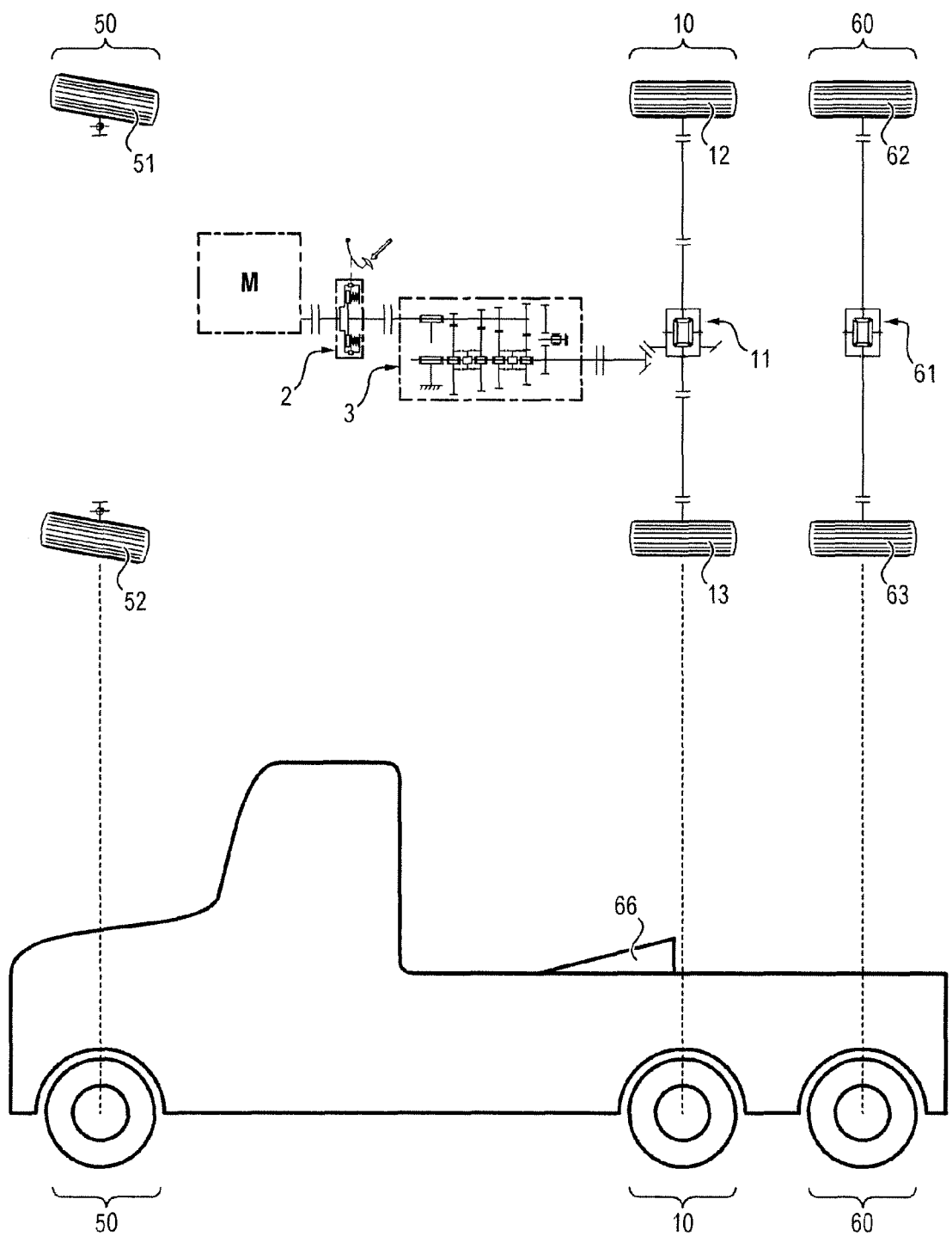
Figure 6:
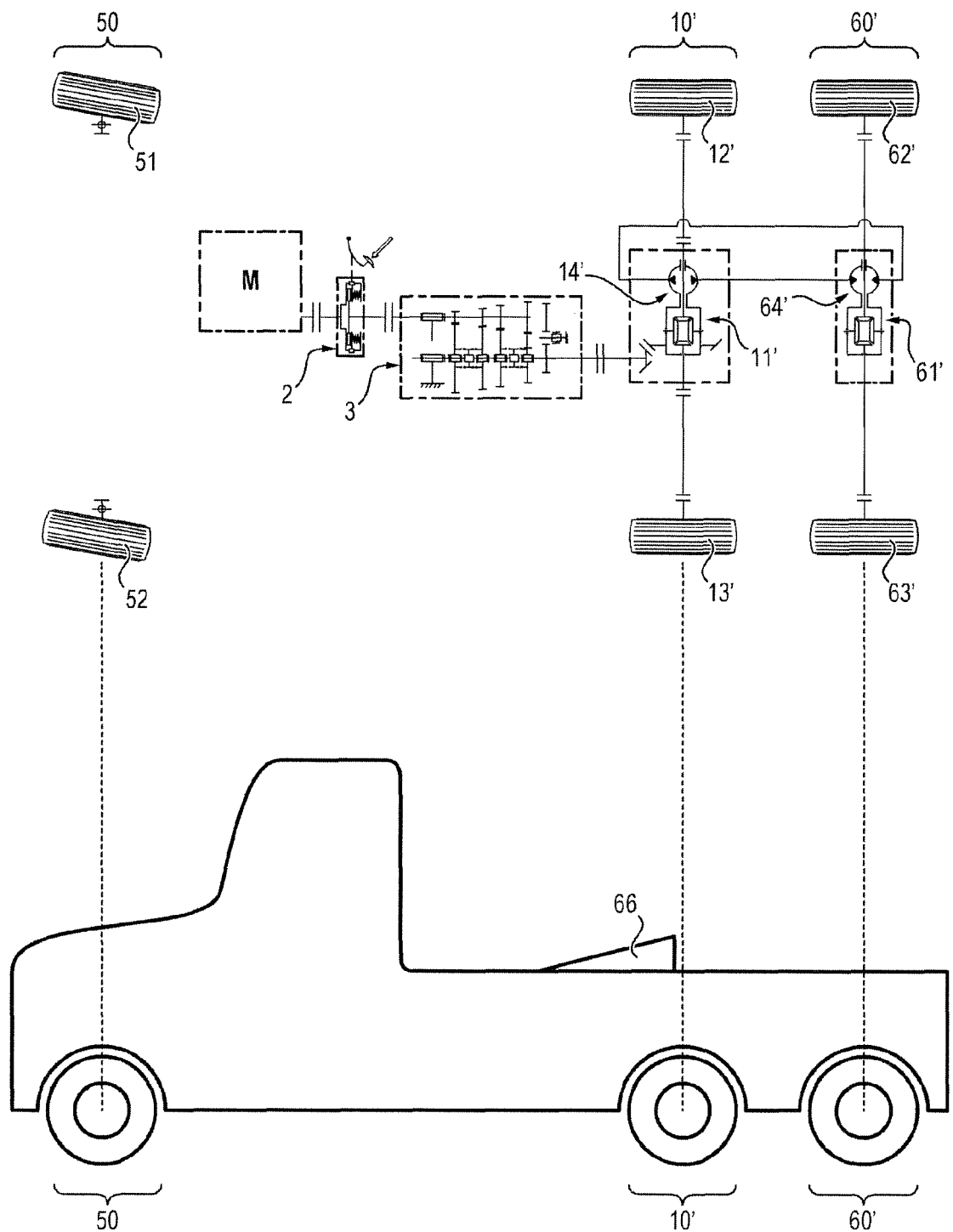

Other characteristics, aims and advantages of the invention will emerge from the following description, which is purely illustrative and non-limiting, and which must be considered with respect to the appended drawings, in which:

FIG. 1 schematically illustrates an example of an assistance circuit for as vehicle according to an aspect of the invention, FIG. 2 illustrates an example of integration of the boost circuit for such an assistance circuit, FIG. 3 illustrates another variant example of an assistance circuit according to an aspect of the invention, FIG. 4 illustrates another example of an embodiment of an assistance circuit according to an aspect of the invention, FIGS. 5 and 6 illustrate an example of use of an assistance kit according to an aspect of the invention.

In all the figures, common elements are designated by identical reference numerals.

DETAILED DESCRIPTION

FIG. 1 schematically illustrates an example of an assistance circuit according to an aspect of the invention.

This figure schematically illustrates a structure of a vehicle comprising a chassis, a driving axle 10 and a driven axle 20, each of the axles bearing two wheels, respectively 12, 13, 22 and 23.

The driving axle 10 is connected to a primary motor M, typically thermal a motor, by means of a clutch 2 and a gearbox 3 ensuring it is driven.

In the illustrated embodiment, each of the driving axles 10 and driven axles 20 comprises a differential, respectively 11 and 21, for turning the wheels of the same axle at different rotation speeds, especially in case of cornering or loss of adherence of one of the wheels.

The structure of a differential is well known and will not be detailed here. However the function of such a device is understood, which transmits input torque applied to a differential housing with two shafts, in this case two semi-axles via pinions, enabling both semi-axles to turn at different speeds. The speed of rotation of the differential case is equal to the average between the speeds of rotation of both semi-axles.

In the embodiment illustrated, each of the axles comprises a hydraulic device. The driving axle 10 comprises a first hydraulic device 14 connected on the one hand to the chassis, and on the other hand to the driving axle 10, and the driven axle 20 comprises a second hydraulic device 24 connected on the one hand to the chassis, and on the other hand to the driven axle 20.

Throughout the text, reference will be made to a hydraulic device mounted on a given axle, given that the rotor of this hydraulic device is connected in rotation to this axle, whereas the stator of the hydraulic device is connected to the fixed chassis of the vehicle.

These two hydraulic devices 14 and 24 are connected by hydraulic conduits so that one operates as a pump so as to generate a flow and feed the other which operates as a motor.

These two hydraulic devices 14 and 24 are typically reversible hydraulic devices of radial piston type well known to those skilled in the art, which can alternate between a free wheel configuration and a service configuration, for example by retraction of the pistons into their respective housings, or by disengagement of the cylinder bock so as to have zero displacement.

The hydraulic devices can have a function of a pump or motor, according to the nature of their feed. A hydraulic device is reversible, and can therefore alternate between these two functions if the nature of its feed varies.

A hydraulic device to which input torque is applied, for example by means of a shaft, will generate a flow and therefore function as a pump. Inversely, a hydraulic device to which a flow is applied will generate torque, and function as a motor.

An example of a structure of hydraulic device which can be put into service or disengaged by engagement or disengagement of the cylinder block comprises two assemblies mobile in rotation one relative to the other:
  a first assembly defined by the casing, and
  a second assembly defined by the shaft, said first and
    second assemblies being free in rotation one relative to
    the other.

The cylinder block is mounted free in rotation relative to said first and second assemblies. The cam is connected in rotation to one or the other of these assemblies. An actuator selectively causes immobilisation of the cylinder block relative to the other of said first or second assemblies, such that the cylinder block and the cam are each connected in rotation to a separate assembly, which carries out the operation of the hydraulic device.

The two hydraulic devices 14 and 24 being each mounted on an axle, they turn at an intermediate speed between the speed of the wheels of this axle, the speed between the wheels of the same axle possibly being different due to the differential.

More precisely, given the driving axle 10; the differential 11 divides this driving axle 10 into two semi-axles 15 and 16, on which the wheels 12 and 13 are respectively mounted.

The first hydraulic device 14 is connected in rotation to the housing of the differential 11.

In the same way, the driven axle 20 is divided into two semi-axles 25 and 26 by the differential 21, these axles respectively bearing the wheels 22 and 23. The second hydraulic device 24 is connected in rotation to the housing of the differential 21 of this driven axle 20.

As a variant, the driven axle 20 can be formed by separate semi-axles, not connected by a differential, each bearing one of the wheels 22 and 23. Each of the wheels 22 and 23 is equipped with a separate hydraulic motor, commonly qualified as a wheel motor. These hydraulic motors are fed by the first hydraulic device 14, typically according to mounting in series or in parallel.

The hydraulic devices 14 and 24 are typically hydraulic devices with radial pistons each comprising:
  a port plate and a multilobe cam defining a first assembly,
  a cylinder block defining a second assembly,
one of said assemblies being mounted fixed in rotation relative to the differential housing, and the other of said assemblies being rotatably mounted relative to the differential housing so as to allow driving in rotation of the differential housing by said hydraulic device.

The two hydraulic devices 14 and 24 are typically fixed displacement devices and have advantageously the same displacement so that the wheels of the different axles turn at the same speed.

Displacement of the hydraulic devices is however adapted to take into consideration the losses and leaks; their different displacements are therefore of the order of a few percent for example.

To illustrate the function, the configuration in which the primary motor M drives the driving axle 10, and the two hydraulic devices are in free wheel configuration is considered.

Only the driving axle drives the wheels which are therefore the only motorised wheels of the vehicle.

In the example presented, given that the driven axle 20 is the front directive axle, this configuration is therefore that of a propulsion vehicle.

To put hydraulic assistance into service, the two hydraulic devices 14 and 24 are operated, typically by extending the pistons from their housings in case of hydraulic devices with retractable radial pistons.

The first hydraulic device 14 is driven by the driving axle 10, and more particularly by the housing of the differential 11 of the driving axle 10 and operates as a hydraulic pump, to deliver a flow which feeds the second hydraulic device 24 which operates as a hydraulic motor, and drives the housing of the differential 21 of the driven axle 20 in rotation. This produces all-wheel transmission on the vehicle, by sampling torque on the driving axle 10 and transmitting this torque to the driven axle 20 via the hydraulic devices 14 and 24.

Inversely, to disengage the hydraulic assistance, it suffices to switch the hydraulic devices 14 and 24 into free wheel configuration, for example by retraction of their pistons in the respective housings of their cylinder blocks.

Also, during braking, negative torque is applied to the driving axle 10. The function of the hydraulic devices is now reversed; the hydraulic device 14 of the axle 10 has a motor function, whereas the hydraulic device 24 of the axle 20 has a pump function, enabling synchronisation of axles at braking, by deferral of the braking torque.

The system also typically comprises a boost pump associated with a boost circuit to especially compensate for the losses of the hydraulic circuit.

The boost pump can be arranged so as to be driven in rotation by the primary shaft of the gearbox 3 of the vehicle 1, or by the primary motor M.

FIG. 2 illustrates an example of integration of the boost circuit for the assistance circuit presented in FIG. 1.

This figure illustrates a boost pump 61 mounted on the primary shaft 31 of the gearbox 3 of the vehicle 1, the boost pump 61 being configured so as to sample oil in a reservoir or a casing, for example the casing of the hydraulic device 14 of the axle 10, to boost the hydraulic circuit connecting the hydraulic device 14 of the axle 10 and the hydraulic device 24 of the axle 20.

The boost is done here by means of a known structure of non-return valves 62 adapted to inject oil into the hydraulic circuit, and a pressure limiter 63 for evacuating excess pressure for example when the boost of the circuit is not necessary.

Such mounting of the boost pump 61 on the primary shaft 31 of the gearbox 3 ensures continuous boost of the hydraulic circuit whenever the vehicle is in motion.

FIG. 3 presents another variant example of an assistance circuit according to an aspect of the invention.

The presented structure comprises a driving axle 10 connected to a primary motor M via the intermediary of a clutch 2 and a gearbox 3 as presented previously.

The driving axle 10 is divided by the differential 11 into two semi-axles 15 and 16, on which are respectively mounted the wheels 12 and 13

In this embodiment, the wheels 22 and 23 are each mounted on a separate semi-driven axle, respectively 27 and 28.

Each of the driving and driven semi-axles comprises a hydraulic device.

The semi-axles 15 and 16 of the driving axle 10 each comprise a hydraulic device, respectively 17 and 18. The semi-driven axles 27 and 28 each comprise a hydraulic device, respectively 37 and 38, commonly qualified as wheel motors.

Contrary to the embodiment presented in FIG. 1, hydraulic devices are not necessarily connected in rotation to the housing of the differential of their associated axle, and the speed of rotation of each of the hydraulic devices is identical to the speed of rotation of the wheel with which it is associated.

The hydraulic devices are connected two by two, defining two couples of hydraulic devices each corresponding to one side of the vehicle.

The hydraulic device 17 is connected to the hydraulic device 37, and the hydraulic device 18 is connected to the hydraulic device 38.

As for the embodiment of FIG. 1, it is considered here by way of example that the primary motor M drives the driving axle 10, and the four hydraulic devices 17, 18, 37, 38 are in free wheel configuration.

These hydraulic devices can be switched to service configuration to produce partial or total hydraulic assistance on the vehicle; the hydraulic device 17 functions as a pump to drive the hydraulic device 37 which functions as a motor and drives the wheel 22, and the hydraulic device 18 functions as a pump to drive the hydraulic device 38 which functions as a motor and drives the wheel 23.

As a variant, the driving axle 10 can comprise a single hydraulic device connected in rotation to the housing of the differential 11 in the same way as on the structure presented in FIG. 1, this hydraulic device being connected to two hydraulic devices 37 and 38 mounted on the two rear semi-axles as shown in FIG. 3.

The displacements of the different hydraulic devices are adapted as a consequence; considering that the single hydraulic device of the driving axle 10 has a displacement equal to 1, each of the hydraulic devices 37 and 38 has a displacement equal to ½, except for the losses and leaks.

The structure presented can also be adapted to a vehicle having more than two axles. To illustrate such variants, FIG. 4 illustrates a variant of the embodiment of FIG. 1, adapted to a vehicle having two driven axles.

This figure shows the structure presented in FIG. 1, to which is added a second driven axle 40 similar to the driven axle 20 presented previously.

As for the driven axle 20, the second driven axle 40 comprises a differential 41 dividing in into two semi-axles 45 and 46 each bearing a wheel, respectively 42 and 43. A hydraulic device 44 is mounted on the second axle 40, and connected in rotation to the housing of the differential 41 of the second driven axle 40.

The hydraulic devices 24 and 44 mounted on the driven axles are mounted in parallel. So, in the event where the hydraulic device 14 of the driving axle 10 functions as a pump and the two hydraulic devices 24 and 44 function as a motor, the intakes of the hydraulic devices 24 and 44 are both connected to the backflow of the hydraulic device 14, and the backflows of the hydraulic devices 24 and 44 are both connected to the intake of the hydraulic device 14.

The displacements of the different hydraulic devices are adapted consequently; considering that the hydraulic device 14 of the driving axle 10 has a displacement equal to 1, each of the hydraulic devices 24 and 44 has a displacement equal to ½.

More generally, given a mounting with a driving axle and $N-1$ driven axles each comprising a hydraulic device, the hydraulic device of the driving axle has a displacement equal to $1+(N\times E)$ and each of the hydraulic devices of the driven axles has a displacement equal to $1/(N-1)$, E representing the value of the estimated losses and leaks for a hydraulic device mounted on a driven axle.

The hydraulic devices used can have controlled variable displacement so that their displacements respective are adapted so the sum of the displacements of the hydraulic devices operating as a pump is equal to the sum of the displacements of the hydraulic devices operating as a motor close to the losses and leaks, or fixed displacement.

The structure of hydraulic assistance circuit presented applies advantageously to trucks.

Trucks are known, for example having three axles; a front axle and two rear axles. The front axle is driven, whereas the two rear axles are commonly driving, such transmission with two axles driving being necessary in some conditions of use, especially during snow, or when starting on a hill.

But, apart from these conditions of use, such assistance is superfluous and simple transmission with a single driving axle is enough.

The assistance structure presented previously can be exploited to create hydraulic assistance engaged selectively.

A truck has for example 6 or 8 wheels distributed over 3 or 4 axles. Of these axles, only one "rear" axle, that is, an axle arranged near the coupling point of the truck with a trailer, is driving, driven by the primary motor of the vehicle, for example a thermal motor.

This driving axle has a hydraulic device adapted to function as a pump, as shown previously, coupled to a second hydraulic device adapted to function as a motor, arranged on another axle of the vehicle, typically a second rear axle of the vehicle, these two hydraulic devices being connected by a hydraulic circuit so as to allow sampling of the torque of the driving axle to create hydraulic assistance on another axle.

Assistance can also be placed on several axles, as shown previously especially in reference to FIG. 4.

The hydraulic assistance is advantageously coupled to a computer, configured so as to selectively engage or disengage the hydraulic assistance as a function of the conditions of use.

For example, the hydraulic assistance can be configured so as to be engaged when the speed of the vehicle is less than or equal to a threshold value, and to disengage when the speed of the vehicle exceeds this threshold value.

The computer can also consider the inclination of the vehicle, its load and the presence or not of a hitching point.

The hydraulic assistance structure presented moves for example from a configuration 6×2 to a configuration 6×4 or 6×6, or from a configuration 8×2 to a configuration 8×4, 8×6 or 8×8 when the conditions of use require this, and the hydraulic assistance is deactivated when it becomes superfluous, which prevents losses in power.

The designation N×M designates a vehicle having N wheels whereof M are motorised wheels.

The hydraulic assistance structure presented can also be in the form of a kit which can be adapted to an existing vehicle, such as a truck.

Such a kit comprises two axles, each fitted with a hydraulic device connected together as described previously, such that the association of one of these hydraulic devices to an input shaft, for example a primary motor of a vehicle turns a function of this hydraulic device into a pump, which then feeds the other hydraulic device having a motor function, and creates hydraulic assistance on its axle by sampling torque applied to the axle of the hydraulic device operating as a pump.

Such a kit forms a hydraulically independent assembly; the hydraulic circuit connecting the hydraulic devices is closed and needs additional no hydraulic components, with the exception of a boost pump, enabling simplified installation on a vehicle.

Such a kit can be mounted on a vehicle, for example replacing two or more of its existing axles.

FIGS. 5 and 6 show an example of application of such a kit.

FIG. 5 shows a conventional structure of a truck with 6 wheels distributed over 3 axles:
- a driving axle 10 comprising a differential 11 driven in rotation by a gearbox 3 coupled to a primary motor M via a clutch 2,
- a directive front axle 50 comprising two directive wheels 51 and 52,
- a rear driven axle 60 comprising a differential 61 and two wheels 62 and 63.

The truck further comprises an anchoring point 66 to attach a trailer or a hitch, placed substantially near the axles 10 and 60.

It is understood that this example is purely illustrative, and that such a kit can be also adapted to a vehicle having a separate number of wheels and axles.

FIG. 6 illustrates the effect of the use of a kit such as described previously to replace the axles 10 and 60 of the vehicle by axles fitted with hydraulic devices for providing assistance.

The axles 10 and 60 are replaced by axles 10' and 60', each comprising a differential respectively 11' and 61', two wheels, respectively 12', 13', 62' and 63', as well as a hydraulic device, respectively 14' and 64'.

The function is similar to the function described previously for example in reference to FIG. 1 with the axles 10 and 20; the hydraulic devices 14' and 64' take off torque on the driving axle 10' driven by the primary motor M to create assistance on the driven axle 60'.

An existing vehicle can be fitted with selective hydraulic assistance on one or more of its axles by use of a kit such as presented.

Also, the axle 60' fitted with hydraulic assistance can be an axle of adjustable type comprising an actuator for varying its height relative to the ground, for modifying its configuration and in particular the fact that the wheels of the axle are or are not in contact with the ground according to the conditions of use, creating savings in power when an extra axle is not required to support the load of the vehicle.

A structure with an adjustable driving axle is conventionally delicate to make; the mechanical transmissions used commonly involve fixed shafts connecting the axles.

The proposed structure for producing hydraulic assistance on a driven axle does away with such restrictions; the links and conduits employed for the hydraulic device placed on the driven axle 60' for which assistance is created can be of flexible hydraulic type, and this driven axle 60' can be mechanically independent of the driving axle 10'.

An adjustable driving axle can be produced, advantageous in terms of energy savings. In this way, the functions of double traction axle, temporarily, and adjustable axle can be combined on the vehicle and on the same axle.

In the different embodiments, the driving and driven axles can form a hydraulically autonomous assembly without hydraulic connection with other sections of said vehicle with the exception of a boost pump.

The vehicle structure presented produces hydraulic assistance by tapping off torque on an axle of a vehicle and transmitting this torque to another axle on which hydraulic assistance is provided.

This structure in which the hydraulic devices are mounted on the axles retains ratio substantially equal to 1 between the speed of rotation of the wheels and the speed of rotation of the different hydraulic devices, which is advantageous for hydraulic devices with radial pistons which function at low speeds of rotation and generate high torque.

Also, the use of hydraulic devices which can shift from a free wheel configuration to a service configuration produces this structure without clutches for different hydraulic devices, contrary to conventional structures in which hydraulic devices are mounted on a power take-off of a motor or on a gearbox shaft and therefore need an extra clutch to execute their selective operation.

The embodiments presented in FIGS. 1 and 3 correspond for example to a transmission of propulsion type, with directive front wheels and rear motorised wheels, which can switch to all-wheel drive via hydraulic assistance.

It is clear that the structure presented can also be adapted to transmissions of traction type comprising front motorised and directive wheels, or with front motorised wheels and rear directive wheels, or again with a transmission of propulsion type with rear motorised and directive wheels.

The invention claimed is:

1. A vehicle comprising a chassis, a driving axle and a driven axle each connected to wheels, and a primary motor rotatably driving said driving axle, said vehicle further comprising a hydraulic pump and a hydraulic motor configured to selectively provide hydraulic assistance for driving the wheels of the driven axle, said hydraulic motor and hydraulic pump being respectively mounted on the driven axle and on the driving axle, are each rotatably connected on the one hand to the chassis, and on the other hand to said driven axle and driving axle respectively, and are configured so that their operation provides driving of the wheels of the driven axle by sampling of the torque applied to the driving axle, wherein the driving axle comprises a differential defining two first output semi-axles on which respective wheels are mounted, said differential comprising a differential housing fitted with housing pinions adapted to cooperate with pinions each connected to a corresponding one of said two first output semi-axles, rotation of the housing rotatably driving said first output semi-axles at different speeds, the hydraulic pump comprising a rotor and a stator, the stator being mounted fixed relative to the chassis and the rotor being rotatably connected to the housing of the differential, the hydraulic pump being rotatably driven at a speed equal to the average speed of the two first output semi-axles.

2. The vehicle according to claim 1, wherein the driven axle comprises a differential defining two second output semi-axles on which respective wheels are mounted, said differential comprising a differential housing fitted with housing pinions adapted to cooperate with pinions each connected to a second corresponding one of said second output semi-axles, rotation of the housing rotatably driving said second output semi-axles at different speeds, the hydraulic motor comprising a rotor and a stator, the stator being mounted fixed relative to the chassis and the rotor being rotatably connected to the housing of the differential, each of said hydraulic motor and hydraulic pump is directly connected to said differential housing without the intermediary of a clutch.

3. The vehicle according to claim 1, wherein the hydraulic pump and the hydraulic motor are hydraulic devices with retractable radial pistons and a multilobe cam, which can alternate between a service configuration and a free wheel configuration wherein they have zero displacement.

4. The vehicle according to claim 1, wherein the hydraulic pump and the hydraulic motor are hydraulic devices with radial pistons each comprising a casing, a shaft, a multilobe cam and a cylinder block, said hydraulic devices each comprising two assemblies able to rotate freely one relative to the other:

a first assembly defined by the casing, and a second assembly defined by the shaft, the cylinder block being mounted to rotate freely relative to said first and second assemblies, the multilobe cam being rotatably connected to one or the other of these assemblies, each of said hydraulic devices further comprising an actuator for selectively producing immobilisation of the cylinder block relative to the other of said first or second assemblies, such that the cylinder block and the cam are rotatably connected to a separate assembly, which causes the operation of the hydraulic device.

5. The vehicle according to claim 1, wherein said driving and driven axles form a hydraulically autonomous assembly without hydraulic connection with other sections of said vehicle with the exception of a boost pump.

6. The vehicle according to claim 1, further comprising a driven directive axle wherein the driven axle comprising the hydraulic motor is an adjustable axle comprising an actuator adapted to vary its height relative to the ground.

7. The vehicle according to claim 1, comprising the driving axle and N−1 driven axles, with N being a natural whole number greater than or equal to 2, each of said axles being fitted with a hydraulic device, the hydraulic devices of each driven axle being connected together so that the hydraulic devices of the driven axles are mounted in parallel relative to the hydraulic device of the driving axle, said N hydraulic devices being configured such that displacement of the hydraulic device mounted on the driving axle is equal to $1+(N \times E)$ and displacement of each of the hydraulic devices of the driven axles is equal to $1/(N-1)$, where E represents the value of the estimated losses and leaks for a hydraulic device mounted on a driven axle.

8. The vehicle according to claim 1, further comprising a computer adapted, as a function of the conditions of travel of the vehicle, to define a threshold value such that when the travel speed of the vehicle is less than or equal to said threshold value, at least one hydraulic motor and at least one hydraulic pump are put into service so as to produce hydraulic assistance on one or more axles of the vehicle, and when the travel speed of the vehicle is greater than said threshold value, the hydraulic assistance is disengaged.

* * * * *